United States Patent [19]
DeLongchamp

[11] 3,861,637
[45] Jan. 21, 1975

[54] SUSPENSION DEVICE FOR A VEHICLE SEAT AND ESPECIALLY A TRACTOR SEAT

[75] Inventor: Jacques Albert Huot DeLongchamp, Paris, France

[73] Assignee: Sable Freres International, Seine-Saint-Denis, France

[22] Filed: May 25, 1973

[21] Appl. No.: 364,119

[30] Foreign Application Priority Data
June 13, 1972 France .............................. 72.21180

[52] U.S. Cl.................. 248/399, 297/303, 297/345
[51] Int. Cl............................ B60n 1/02, A47c 3/30
[58] Field of Search .......... 248/399, 400, 408, 409, 248/423, 162; 297/307, 308, 309, 345

[56] References Cited
UNITED STATES PATENTS

| 3,139,304 | 6/1964 | Lehner et al. ...................... 297/308 |
| 3,291,525 | 12/1966 | Fritzmeier.......................... 297/308 |
| 3,326,603 | 6/1967 | Lehner............................... 297/308 |
| 3,480,324 | 11/1969 | Bauer et al. ........................ 248/399 |
| 3,572,828 | 3/1971 | Lehner............................... 248/399 |
| 3,705,745 | 12/1972 | Ambrosius.......................... 248/399 |
| 3,756,654 | 9/1973 | Bauer................................. 297/345 |
| 3,761,045 | 9/1973 | Sturham............................. 248/399 |

FOREIGN PATENTS OR APPLICATIONS

| 2,004,147 | 11/1969 | France .............................. 297/307 |
| 2,025,529 | 12/1971 | Germany ........................... 297/307 |

Primary Examiner—Marion Parsons, Jr.
Attorney, Agent, or Firm—Toren, McGeady and Stanger

[57] ABSTRACT

The suspension device essentially comprises elastic means having a vertical action for the suspension proper of the seat and disposed between a first vertically movable member and a supporting element, first means for adjusting the flexibility of the suspension by modifying the vertical distance under no load between the movable member and the supporting element, a second vertically movable member which directly supports the seat and is rigidly fixed thereto, second means for adjusting the height of the seat by modifying the relative vertical position of the first and second movable members, and third means for coupling the first and second movable members on completion of adjustment.

3 Claims, 2 Drawing Figures

SUSPENSION DEVICE FOR A VEHICLE SEAT AND ESPECIALLY A TRACTOR SEAT

This invention relates to suspension systems for vehicle seats and especially for tractor seats.

The aim of the invention is to provide a suspension device which is so designed that both the flexibility of suspension and the height of the seat can readily be adjusted.

A further aim of the invention is to provide a device of this type which has a particularly simple structure.

The suspension device in accordance with the invention essentially comprises elastic means having a vertical action for the suspension proper of the seat and disposed between a first vertically movable member and a supporting element, first means for adjusting the flexibility of the suspension by modifying the vertical distance under no load between the movable member and the supporting element, a second vertically movable member which directly supports the seat and is rigidly fixed thereto, second means for adjusting the height of the seat by modifying the relative vertical position of the first and second movable members, and third means for coupling the first and second movable members on completion of adjustment.

Further characteristic features of the invention will become apparent from the following description, reference being made to the accompanying drawings, in which.

Figure 1:
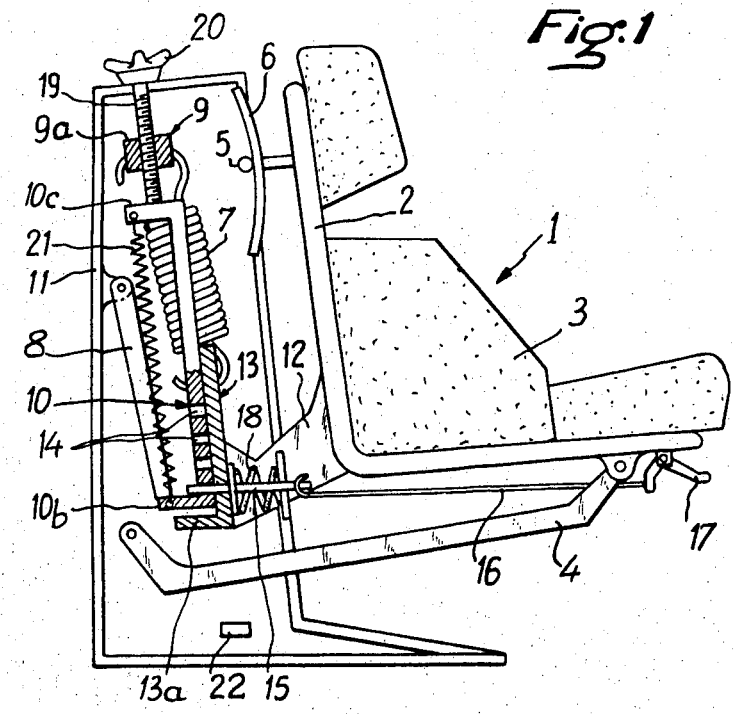
FIG. 1 is a diagram in which a device according to the invention is shown in elevation and partly in cross-section.
Figure 2:
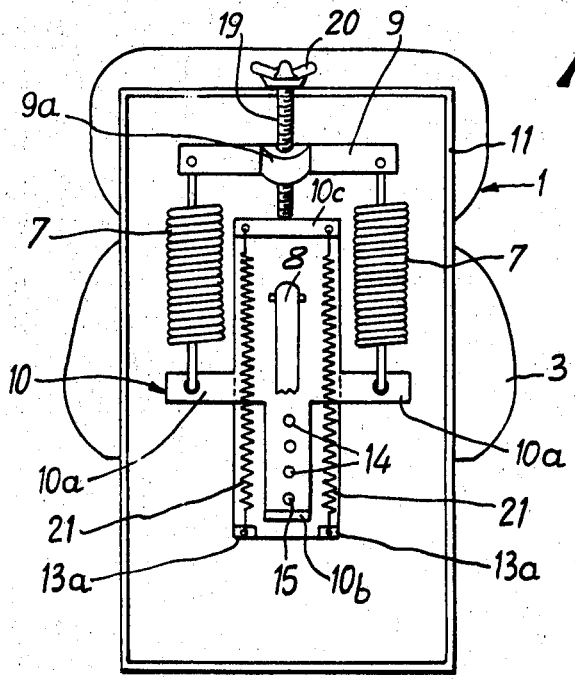
FIG. 2 is a rear view of the device shown in FIG. 1.

The seat 1 proper comprises in known manner a supporting frame 2 constructed, for example, of bent metallic tubing, a padded casing 3, lower guiding means 4 such as rocking levers, for example, and upper guiding means constituted, for example, by a roller 5 which is secured to the frame 2 and runs along a fixed concave track 6.

The seat suspension is provided by means of two coil-type tension springs 7 which may be coupled if necessary to a dynamic shock-absorber 8. The springs 7 are attached at the upper ends to a movable adjusting yoke 9 and at the lower ends to side arms 10a of a movable member 10. The shock-absorber 8 is attached at the upper end to a stationary frame 11 and at the lower end to a flange 10b of the member 10. The body of the shock-absorber 8 also constitutes the fixed upper stop for limiting the suspension travel.

The seat 1 is mounted on the member 10 in such a manner as to be adjustable for height. The frame 2 carries a gusset-plate 12 and a vertical member 13 which is parallel to the member 10 is fixed on the gusset-plate. The member 13 which directly supports the seat 1 can be attached to the member 10 in such a manner as to permit adjustment for height. To this end, the member 10 is provided with a plurality of holes 14, a horizontal locking-bolt 15 slidably supported by the member 13 being intended to engage in one of the holes. The locking-bolt 15 is attached to a link-rod or cable 16 which extends beneath the seat towards the front of this latter and is in turn attached to a rocking-lever 17 which forms a control lever and is placed beneath the front end of the seat. The locking-bolt is urged elastically to the locking position by a spring 18. The member 13 is urged upwards elastically by springs 21 which are attached to an upper flange 10c of the member 10 and to bottom flanges 13a of the member 13.

The yoke is capable of moving vertically under the action of a screw 19 fitted with a control knob 20 which is placed behind the seat 1. the screw passes through a nut 9a of the yoke 9 and the lower end of the screw is applied against the upper flange 10c. By rotating the control knob 20, the user modifies the distance under no load between the yoke 9 and the member 10 by causing the displacement of the yoke 9 while the member 10 remains stationary.

The device also comprises means (not shown in the drawings) for guiding the member 10 with respect to the frame 11 and for guiding the member 13 with respect to the member 10.

The use and operation of the device in accordance with the invention are as follows: When the seat is unoccupied, the suspension springs 7 urge the member 10 upwards and consequently also maintain the seat 1 in the top position by means of the member 13 which is attached to the member 10. The member 10 is thus abuttingly applied against the body of the shock-absorber which constitutes the fixed upper stop for limiting the range of suspension travel. When the user sits down, he causes the downward displacement of the suspension system over a distance at which his weight balances the tension of the springs 7. When seated, the user rotates the control knob 20, thereby displacing the yoke 9 and also displacing the seat 1 at the same time. The object of this control operation is to adjust the suspension as a function of the weight of the user. It is usually considered that, in the static condition, the suspension system must be displaced downwards to one-half its range of travel under the weight of the user.

By carrying out the above-mentioned adjustment of the flexibility of suspension, the height of the seat under load is modified but the end positions of the seat as defined by the shock-absorber and by a stationary bottom stop 22 remain fixed. Having adjusted the suspension system, the user then adjusts the height of the seat as a function of his own height and general comfort. For this purpose, he lifts the control lever 17, with the result that the locking-bolt 15 is withdrawn from the member 10. In order to adjust the seat to a higher position, the user permits the upward displacement of the seat under the action of the springs 21; but if it is desired to lower the position-setting, the user applies light downward pressure on the seat, thereby displacing the member 13 in a downward sliding movement in opposition to the action of the restoring springs 21. It is of interest to note that the springs 21 are much less powerful than the suspension springs 7 which are mounted in series with these latter. The result thereby achieved is that, during this adjustment, the suspension system is displaced downwards over a very short distance which practically does not modify the height setting. Once the selected height has been reached, the user releases the control lever 17, which has the effect of releasing the locking-bolt 15 and permitting this latter to engage in the corresponding hole 14 in order to interlock the seat 1 and the member 10.

I claim:

1. A vehicle seat structute for an agricultural vehicle, or the like, comprising a substantially L-shaped supporting frame, a mounting frame for mounting said supporting frame on the vehicle, guiding means for directly guiding said supporting frame with respect to said mounting frame for substantially vertical movement of said supporting frame, an intermediate seat-height adjusting means movably mounted within said mounting frame, means mounting said adjusting means for vertical movement within said mounting frame, said adjusting means having a first part fixed to said supporting frame and a second part movable vertically relative to said first part, manually operable locking means for locking said first part of said adjusting means to said second part at any selected position, initial tension-adjusting means comprising an initial supporting part operatively connected to said mounting frame and an initial tension adjusting part vertically movable with respect to said supporting part, manually operable control means for vertically adjusting said adjusting part with respect to said initial tension supporting part, and resilient elongated suspension means vertically located between said supporting frame and said mounting frame and having their ends attached respectively to said initial adjusting part and to said second part of said seat-height adjusting means.

2. A suspension device according to claim 1, further comprising resilient restoring means operatively connected at one end to said first part of said seat-height adjusting means and at the other end to said second part of said seat-height adjusting means, said restoring means having a restoring force greater than the weight of said supporting frame for urging said supporting frame upwardly with respect to said second part of said adjusting means.

3. A suspension device according to claim 2, wherein said guide means comprises a roller fixed to said supporting frame, a fixed concave track supported by said mounting frame on which said roller is guided, and a rocking lever having one end pivotally connected to said mounting frame and one end pivotally connected to said supporting frame.

* * * * *

UNITED STATES PATENT OFFICE
CERTIFICATE OF CORRECTION

Patent No. 3861 637              Dated  January 21, 1975

Inventor(s)  Jacques Albert Huot De Longchamp

It is certified that error appears in the above-identified patent and that said Letters Patent are hereby corrected as shown below:

In the heading of the patent, the name and country of the assignee should read:

--[73] Assignee:   SABLE FRERES INTERNATIONAL
                   PANTIN (93) Seine-Saint-Denis, FRANCE Signed and sealed this 8th day of April 1975.

(SEAL)
Attest:

RUTH C. MASON
Attesting Officer

C. MARSHALL DANN
Commissioner of Patents
and Trademarks